US008153256B2

(12) United States Patent
Maeda et al.

(10) Patent No.: US 8,153,256 B2
(45) Date of Patent: Apr. 10, 2012

(54) SOFT MAGNETIC MATERIAL COMPRISING AN INSULATING LAYER CONTAINING ALUMINUM, SILICON, PHOSPHOROUS AND OXYGEN; DUST MAGNETIC CORE; PROCESS FOR PRODUCING SOFT MAGNETIC MATERIAL; AND PROCESS FOR PRODUCING DUST MAGNETIC CORE

(75) Inventors: Toru Maeda, Itami (JP); Naoto Igarashi, Itami (JP); Haruhisa Toyoda, Itami (JP); Seiji Ishitani, Otake (JP); Hiroko Morii, Otake (JP); Kazuyuki Hayashi, Otake (JP)

(73) Assignees: Sumitomo Electric Industries, Ltd., Osaka-Shi (JP); Toda Kogyo Corp., Hiroshima (JP)

( * ) Notice: Subject to any disclaimer, the term of this patent is extended or adjusted under 35 U.S.C. 154(b) by 926 days.

(21) Appl. No.: 12/160,079

(22) PCT Filed: Nov. 22, 2006

(86) PCT No.: PCT/JP2006/323315

§ 371 (c)(1), (2), (4) Date: Jul. 3, 2008

(87) PCT Pub. No.: WO2007/077689

PCT Pub. Date: Jul. 12, 2007

(65) Prior Publication Data

US 2009/0047519 A1 Feb. 19, 2009

(30) Foreign Application Priority Data

Jan. 4, 2006 (JP) ................................ 2006-000216

(51) Int. Cl.
*B32B 5/16* (2006.01)
*H01F 1/12* (2006.01)
*H01F 1/24* (2006.01)

(52) U.S. Cl. ........ 428/403; 148/104; 148/105; 148/306; 428/407; 428/697; 428/704

(58) Field of Classification Search .......... 428/403–407, 428/697, 704
See application file for complete search history.

(56) References Cited

U.S. PATENT DOCUMENTS

2004/0126609 A1 7/2004 Ueta et al.

FOREIGN PATENT DOCUMENTS

JP 7-278825 A 10/1995

(Continued)

OTHER PUBLICATIONS

Online machine translation of JP 2007-042,883 (Feb. 15, 2007).*

(Continued)

*Primary Examiner* — Hoa (Holly) Le
(74) *Attorney, Agent, or Firm* — Osha Liang LLP

(57) ABSTRACT

The soft magnetic material includes a plurality of composite magnetic particles having a metal magnetic particle and an insulating film surrounding the surface of the metal magnetic particle. The metal magnetic particle contains iron as the main component. The insulating film contains aluminum, silicon, phosphorus, and oxygen. The insulating film satisfies the relationship $0.4 \leqq M_{Al}/(M_{Al}+M_{Si}) \leqq 0.9$ and the relationship of $0.25 \leqq (M_{Al}+M_{Si})/M_P \leqq 1.0$ in the case that molar amount of aluminum contained in the insulating film is represented by $M_{Al}$, the sum of the molar amount of aluminum contained in the insulating film and the molar amount of silicon contained in the insulating film is represented by $(M_{Al}+M_{Si})$, and the molar amount of phosphorus contained in the insulating film is represented by $M_P$.

7 Claims, 4 Drawing Sheets

FOREIGN PATENT DOCUMENTS

| | | | | |
|---|---|---|---|---|
| JP | 2003-272911 | | | 9/2003 |
| JP | 2005-113258 | A | | 4/2005 |
| JP | 2005-206880 | A | | 8/2005 |
| JP | 2005206880 | A | * | 8/2005 |
| JP | 2007-042883 | A | | 2/2007 |

OTHER PUBLICATIONS

International Search Report w/translation from PCT/JP2006/323315 dated Feb. 6, 2007 (3 pages).

espacenet.com Abstract of JP2005206880 published on Aug. 4, 2005 (1 page).

espacenet.com Abstract of JP2005113258 published on Apr. 28, 2005 (1 page).

espacenet.com Abstract of JP7278825 published on Oct. 24, 1995 (1 page).

espacenet.com Abstract of JP2003272911 published on Sep. 26, 2003 (1 page).

Office Action for Japanese Patent Application No. 2007-552879 mailed Jul. 12, 2011, with Enlish translation thereof (4 pages).

Patent Abstract for Japanese Publication No. 2007-042883 Published Feb. 15, 2007 (1 page).

* cited by examiner

SOFT MAGNETIC MATERIAL COMPRISING AN INSULATING LAYER CONTAINING ALUMINUM, SILICON, PHOSPHOROUS AND OXYGEN; DUST MAGNETIC CORE; PROCESS FOR PRODUCING SOFT MAGNETIC MATERIAL; AND PROCESS FOR PRODUCING DUST MAGNETIC CORE

TECHNICAL FIELD

The present invention relates to a soft magnetic material, a dust core, a manufacturing method of a soft magnetic material, and a manufacturing method of a dust core.

BACKGROUND ART

An electromagnetic steel sheet is used as a soft magnetic part in an electric device having an electromagnetic valve, a motor, or a power source circuit. Magnetic characteristics that a large flux density can be obtained by applying a small magnetic field and that can respond sensitively to a change in the magnetic field from outside are desired in the soft magnetic part.

In the case of using such a soft magnetic part in an AC magnetic field, an energy loss called an iron loss occurs. This iron loss can be represented as a sum of a hysteresis loss and an eddy current loss. The hysteresis loss is equivalent to the energy that is necessary to change the flux density of the soft magnetic part. Because the hysteresis loss is proportional to the operating frequency, it becomes dominant mainly in a low frequency range of 1 kHz or less. Further, the eddy current loss referred to herein is an energy loss that is generated by an eddy current flowing mainly in the soft magnetic part. Because the eddy current loss is proportional to the square of the operating frequency, it becomes dominant mainly in a high frequency range of 1 kHz or more.

A magnetic characteristic that reduces the generation of this iron loss is desired for the soft magnetic part. In order to realize this, it is necessary to make the magnetic permeability $\mu$, the saturated flux density Bs, and the electric resistivity $\rho$ large, and the coercive force Hc of the soft magnetic part small.

Because of the advancements in making the operating frequency higher towards manufacture of high output and high efficiency devices in recent years, a dust core that has smaller eddy current loss compared with the electromagnetic steel sheet has been attracting attention. This dust core is made of a plurality of composite magnetic particles, and a composite magnetic particle includes a metal magnetic particle and an insulating film coating its surface.

In order to lower the hysteresis loss among the iron loss of the dust core, the coercive force Hc of the dust core may be made small by removing distortion and dislocation in the metal magnetic particles and making movement of a magnetic wall easy. In order to sufficiently remove the distortion and the dislocation in the metal magnetic particles, it is necessary to perform a heat treatment on the molded dust core at a high temperature of 400° C. or more, preferably a high temperature of 550° C. or more, and more preferably a high temperature of 650° C. or more.

However, the insulating film is made of an iron phosphate non-crystalline compound having high adhesiveness to powders that are obtained by a phosphating treatment or the like, and rich in elasticity for the reason that a following property toward powder deformation is desired at molding, and sufficient high temperature stability is not obtained. That is, when the heat treatment is performed on the dust core at a high temperature of 400° C. or more for example, the insulating property is spoiled because constituting metal elements in the metal magnetic particles diffuse and invade into the non-crystalline part, for example. Therefore, when it is intended to lower the hysteresis loss by the high temperature heat treatment, the electric resistivity $\rho$ of the dust core decreases, and there has been a problem that the eddy current loss becomes large. Making an electric device small and efficient, and providing the device with large output has been required in recent years, and in order to satisfy these requirements, it is necessary to use an electric device in a higher frequency range. If the eddy current loss becomes large in the high frequency range, it becomes a hindrance to make the electric device small and efficient, and providing the device with large output.

Therefore, a technique that can improve the high temperature stability of the insulating film is disclosed in Japanese Patent Laying-Open No. 2003-272911 (Patent Document 1) for example. In the above-described Patent Document 1, a soft magnetic material is disclosed made of composite magnetic particles having an aluminum phosphate insulating film with high temperature stability. In the above-described Patent Document 1, the soft magnetic material is manufactured by the following method. First, an insulating coating solution containing phosphate including aluminum and heavy chromate including potassium is jetted onto iron powder. Next, the iron powder jetted with the insulating coating solution is maintained at 300° C. for 30 minutes, and then 100° C. for 60 minutes. With this operation, the insulating film formed on the iron powder is dried. Next, the iron powder on which the insulating film is formed is pressure-molded, the heat treatment is performed after the pressure-molding, and a soft magnetic material is completed.

Patent Document 1: Japanese Patent Laid-Open No. 2003-272911

DISCLOSURE OF THE INVENTION

Problems to be Solved by the Invention

However, in the technique disclosed in the above-described Patent Document 1, the insulating film has a phosphate non-crystalline structure (—O—P—O—) and a chromate non-crystalline structure (—O—Cr—O—) as basic structures and is bonded by a cation element such as aluminum or potassium. In such a non-crystalline material, the more the number of bonds (oxidation number, covalent bond valence) of the cation element is, the higher the density of the basic structure such as phosphate with rich elasticity can be made. However, in the technique disclosed in the above-described Patent Document 1 in which the cation element is aluminum (trivalent) and potassium (monovalent), the valence is relatively low, and the technique has a disadvantage that the elasticity of the insulating film is not high. As a result, the eddy current loss increases, and there is a problem that the iron loss increases.

Therefore, the present invention has been made to solve the above-described problems, and an object of the present invention is to provide a soft magnetic material, a dust core, a manufacturing method of a soft magnetic material, and a manufacturing method of a dust core that are capable of lowering the iron loss.

Means for Solving the Problems

The soft magnetic material according to the present invention includes a plurality of composite magnetic particles having a metal magnetic particle and an insulating film surrounding the surface of the metal magnetic particle. The metal magnetic particle contains iron as the main component. The insulating film contains aluminum (Al), silicon (Si), phosphorus (P), and oxygen (O). In the case that molar amount of aluminum contained in the insulating film is represented by $M_{Al}$, the sum of the molar amount of aluminum contained in the insulating film and the molar amount of silicon contained in the insulating film is represented by $(M_{Al}+M_{Si})$, and the molar amount of phosphorus contained in the insulating film is represented by $M_P$, the relationship of $0.4 \leqq M_{Al}/(M_{Al}+M_{Si}) \leqq 0.9$ and the relationship of $0.25 \leqq (M_{Al}+M_{Si})/M_P \leqq 1.0$ are satisfied.

According to the soft magnetic material of the present invention, aluminum having a large effect of giving heat resistance and silicon having a large effect of improving density of the phosphate structure are contained in the insulating film to the phosphate non-crystalline basic structure. In detail, aluminum has high temperature stability because it has high affinity with oxygen. Therefore, the soft magnetic material is hardly damaged even if the heat treatment is performed at a high temperature. Further, it plays a role of preventing decomposition of a layer formed on a contact surface of the insulating film contacting with the metal magnetic particle. Therefore, the heat resistance of the insulating film can be improved by containing aluminum, and the hysteresis loss of the dust core made by pressure-molding this soft magnetic material can be lowered without deteriorating the eddy current loss. Further, because silicon has 4 bonds (tetravalent), the density of the phosphate non-crystalline structure in the insulating film can be increased, and the elasticity of the insulating film improves. Further, it has a high heat resistance imparting effect although it is not so high as aluminum. Therefore, the deformation-following property of the insulating film can be improved by containing silicon, the eddy current loss is lowered, and at the same time, strength can be improved. Further, because phosphorus and oxygen contained in the insulating film have high adhesiveness to iron, the adhesiveness of the insulating film with the metal magnetic particle containing iron as the main component can be improved. Therefore, by containing phosphorus and oxygen, it becomes difficult for the insulating film to be damaged in pressure-molding, and an increase in the eddy current loss can be suppressed. Therefore, because the insulating film can have advantages of both the aluminum phosphate non-crystalline compound and the silicon phosphate non-crystalline compound, the soft magnetic material can be realized that is capable of lowering the iron loss.

Further, by making $M_{Al}/(M_{Al}+M_{Si})$ 0.4 or more, the heat resistance imparting effect of aluminum improves further. Therefore, the iron loss can be decreased further through decrease in the hysteresis loss. By making MAl/(MAl+MSi) 0.9 or less, a characteristic that cracks in aluminum phosphate are easily generated can be effectively suppressed. Therefore, the iron loss can be decreased further through decrease in the eddy current loss. Further, by making (MAl+MSi)/MP 0.25 or more, the heat resistance imparting effect by aluminum and the deformation-following property imparting effect by silicon improve further. Therefore, the iron loss can be decreased further through decrease in the hysteresis loss and decrease in the eddy current loss. By making (MAl+MSi)/MP 1.0 or less, the adhesiveness of the metal magnetic particle and the insulating film is improved further. Therefore, the iron loss can be decreased further through decrease in the eddy current loss and decrease in the electric resistance.

Here, "containing iron as the main component" means that the ratio of iron is 50% by mass or more.

The relationship of 0.5≦MAl/(MAl+MSi)≦0.8 and the relationship of 0.5≦(MAl+MSi)/MP≦0.75 are preferably satisfied further in the above-described soft magnetic material. By making MAl/(MAl+MSi) 0.5 or more, the heat resistance imparting effect of aluminum improves further. Therefore, the iron loss can be decreased further through further decrease in the hysteresis loss. By making MAl/(MAl+MSi) 0.8 or less, a characteristic that cracks in aluminum phosphate are easily generated can be further effectively suppressed. Therefore, the iron loss can be decreased further through further decrease in the eddy current loss. Further, by making (MAl+MSi)/MP 0.5 or more, the heat resistance imparting effect of aluminum and the deformation-following property imparting effect of silicon improve further. Therefore, the iron loss can be decreased further through further decrease in the hysteresis loss and the eddy current loss. By making (MAl+MSi)/MP 0.75 or less, the adhesiveness of the metal magnetic particle and the insulating film is improved further. Therefore, the iron loss can be decreased further through further decrease in the eddy current loss and decrease in the electric resistance.

The average film thickness of the insulating film is preferably not less than 10 nm to not more than 1 μm in the above-described soft magnetic material. By making the average film thickness of the insulating film 10 nm or more, the energy loss due to the eddy current can be effectively suppressed. Further, by making the average film thickness of the insulating film 1 μm or less, the ratio of the insulating film occupying the soft magnetic material does not become too large. Therefore, the flux density of the dust core obtained by pressure-molding this soft magnetic material can be prevented from remarkably decreasing.

At least one type of resin selected from the group consisting of a silicone resin, an epoxy resin, a phenol resin, an amide resin, a polyimide resin, a polyethylene resin, and a nylon resin is preferably attached to or coat the surface of the insulating film in the above-described soft magnetic material. With this configuration, the joining force between the composite magnetic particles adjacent to each other can be increased further in the dust core made by pressure-molding the soft magnetic material.

Preferably, not less than 0.01% by mass to not more than 1.0% by mass of the resin to the metal magnetic particles is contained in the above-described soft magnetic material. By making the content 0.01% by mass or more, the joining force between the composite magnetic particles adjacent to each other can be increased further. On the other hand, by making the content 1.0% by mass or less, the ratio of the resin occupying the soft magnetic material does not become too large. Therefore, the flux density of the dust core obtained by pressure-molding this soft magnetic material can be prevented from remarkably decreasing.

The dust core according to the present invention can be produced using any of the soft magnetic materials described above. According to the dust core configured in such a manner, a magnetic characteristic of small iron loss can be realized through the decrease in the eddy current loss. In the case of making the dust core, other organic substances may be added from the view of strength. Even in the case that such organic substance exists, the effects by the present invention can be obtained.

The eddy current loss is preferably 35 W/kg or less at a maximum excitation flux density of 1 T and a frequency of 1000 Hz in the above-described dust core. Because the eddy current loss decreases largely by having the insulating film of the present invention, a dust core with smaller iron loss can be made.

The manufacturing method of the soft magnetic material of the present invention includes a step of preparing a metal magnetic particle containing iron as the main component and a step of forming an insulating film surrounding the surface of the metal magnetic particle. The step of forming an insulating film includes a step of mixing and stirring the metal magnetic particles, aluminum alkoxide, silicon alkoxide, and phosphoric acid. With this step, an insulating film can be formed having a phosphate non-crystalline structure with elasticity and high adhesiveness to powders as a basis, containing aluminum with very high heat resistance imparting effect, and containing silicon with the heat resistance imparting effect and that is effective in improving the density of the phosphate structure. By containing aluminum in the insulating film, the heat resistance of the insulating film can be improved, and the hysteresis loss of the dust core made by pressure-molding this soft magnetic material can be lowered without deteriorating the eddy current loss. Further, by containing silicon in the insulating film, the deformation-following property of the insulating film can be improved, and the eddy current loss can be lowered. Therefore, an excellent soft magnetic material can be manufactured that is capable of lowering the iron loss.

The manufacturing method of the dust core of the present invention includes a step of preparing the above-described soft magnetic material and a step of compression-molding the soft magnetic material. With this method, an excellent dust core can be manufactured that is capable of lowering the iron loss.

Effects of the Invention

As described above, the soft magnetic material of the present invention has the insulating film containing aluminum with very high heat resistance imparting effect and silicon with high deformation-following property imparting effect. Therefore, the soft magnetic material can be made that is capable of lowering the iron loss.

DESCRIPTION OF THE REFERENCE SIGNS

Figure 1:
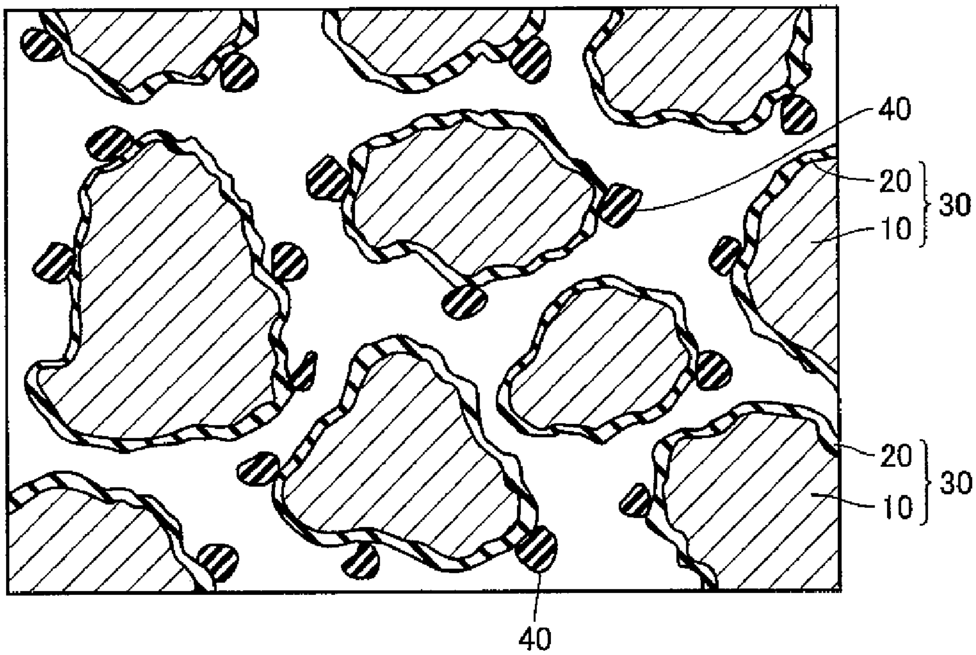
FIG. 1 is a drawing schematically showing the soft magnetic material in an embodiment of the present invention.

10 Metal Magnetic Particle, 20 Insulating Film, 30 Composite Magnetic Particle, 40 Resin, 50 Organic Substance

BEST MODES FOR CARRYING OUT THE INVENTION

In the following, an embodiment of the present invention is described based on the drawings. The same reference numeral is attached to the same or the equivalent part, and the description is not repeated.

Embodiment

FIG. 1 is a drawing schematically showing the soft magnetic material in an embodiment of the present invention. As shown in FIG. 1, the soft magnetic material in the present embodiment includes a plurality of composite magnetic particles 30 having a metal magnetic particle 10 and an insulating film 20 surrounding the surface of metal magnetic particle 10, and a resin 40. Metal magnetic particle 10 contains iron as the main component. Insulating film 20 contains aluminum, silicon, phosphorus, and oxygen. In the case that the molar amount of aluminum contained in insulating film 20 is represented by MAl, the sum of the molar amount of aluminum contained in insulating film 20 and the molar amount of silicon contained in insulating film 20 is represented by (MAl+MSi), and the molar amount of phosphorus contained in insulating film 20 is represented by MP, the relationship of $0.4 \leqq MAl/(MAl+MSi) \leqq 0.9$ and the relationship of $0.25 \leqq (MAl+MSi)/MP \leqq 1.0$ are satisfied.

Figure 2:
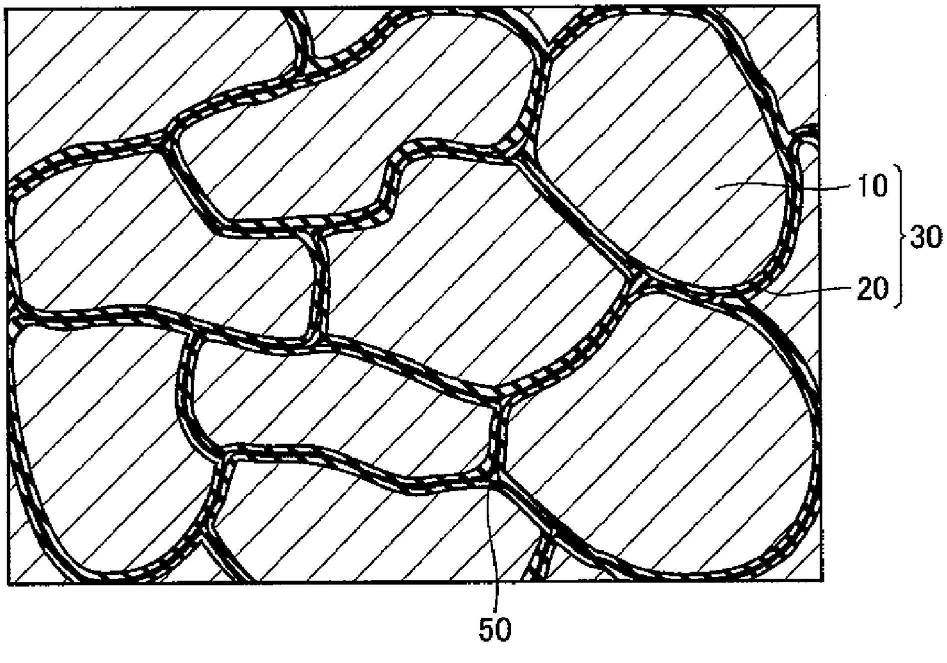
FIG. 2 is a magnified cross-sectional view of the dust core in an embodiment of the present invention.

FIG. 2 is a magnified cross-sectional view of the dust core in an embodiment of the present invention. The dust core in FIG. 2 is manufactured by carrying out the pressure-molding and the heat treatment on the soft magnetic material in FIG. 1. As shown in FIG. 2, each of a plurality of composite magnetic particles 30 is joined by resin 40, or joined by engagement of the unevenness that composite magnetic particles 30 have. An organic substance 50 is a substance to which resin 40 or the like contained in the soft magnetic material is changed in the heat treatment.

In the soft magnetic material and the dust core of the present invention, metal magnetic particle 10 is formed from iron (Fe), an iron (Fe)-silicon (Si) alloy, an iron (Fe)-aluminum (Al) alloy, an iron (Fe)-nitrogen (N) alloy, an iron (Fe)-nickel (Ni) alloy, an iron (Fe)-carbon (C) alloy, an iron (Fe)-boron (B) alloy, an iron (Fe)-cobalt (Co) alloy, an iron (Fe)-phosphorus (P) alloy, an iron (Fe)-nickel (Ni)-cobalt (Co) alloy, an iron (Fe)-aluminum (Al)-silicon (Si) alloy, or the like, for example. Metal magnetic particle 10 may be a single metal or an alloy.

The average particle size of metal magnetic particle 10 is preferably not less than 30 μm to not more than 500 μm. By making the average particle size of metal magnetic particle 10 30 μm or more, the coercive force can be decreased. By making the average particle size 500 μm or less, the eddy current loss can be decreased. Further, the compressing property of mixed powders can be prevented from being lowered during the pressure-molding. Therefore, the density of the molded body obtained by the pressure-molding does not decrease, and handling is prevented from being difficult.

The average particle size of metal magnetic particle 10 is the size of the particle for which the sum of the mass from the side where the particle size is small in a histogram of the particle size reaches 50% of the total mass, that is a 50% particle size.

Insulating film 20 functions as an insulating layer between metal magnetic particles 10. Insulating film 20 contains aluminum, silicon, phosphorus, and oxygen.

Insulating film 20 consists of one layer for example, or a complex phosphate doped with two types of cations of trivalent aluminum and tetravalent silicon can be used. That is, insulating film 20 made from aluminum phosphate and silicon phosphate for example can be used.

Figure 3:
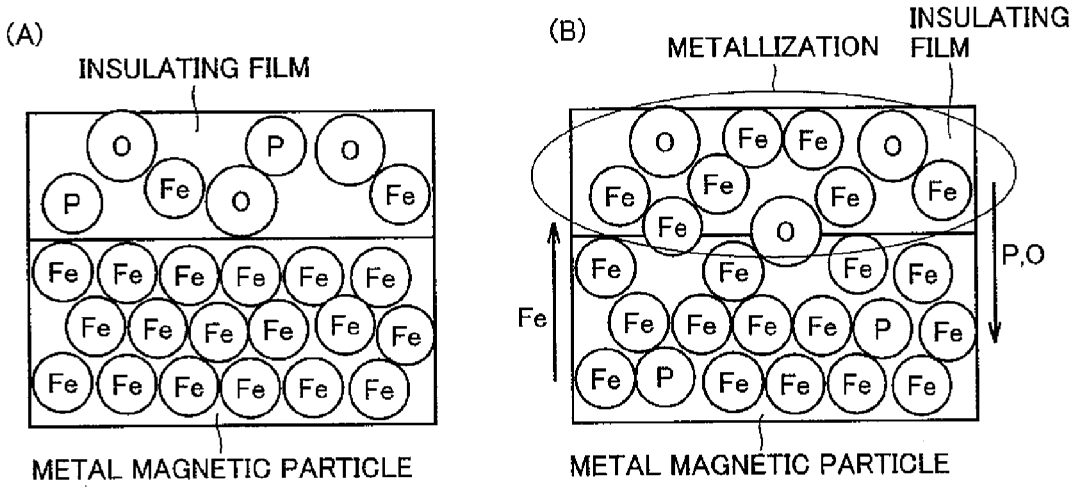
FIG. 3(A) is a schematic view before performing a heat treatment on the soft magnetic material containing the insulating film made from iron phosphate, and (B) is a schematic view after performing a heat treatment on the soft magnetic material containing the insulating film made from iron phosphate.
Figure 4:
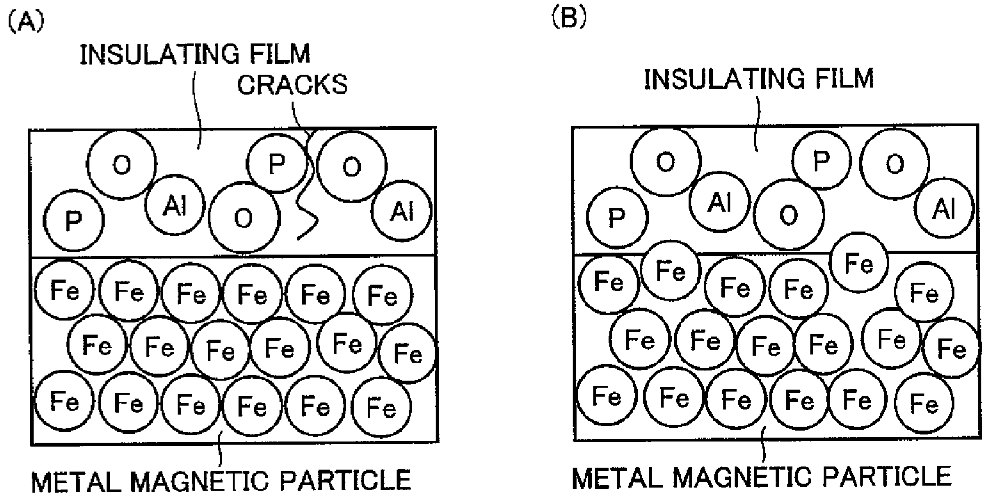
FIG. 4(A) is a schematic view before performing a heat treatment on the soft magnetic material containing the insulating film made from aluminum phosphate, and (B) is a schematic view after performing a heat treatment on the soft magnetic material containing the insulating film made from aluminum phosphate.
Figure 5:
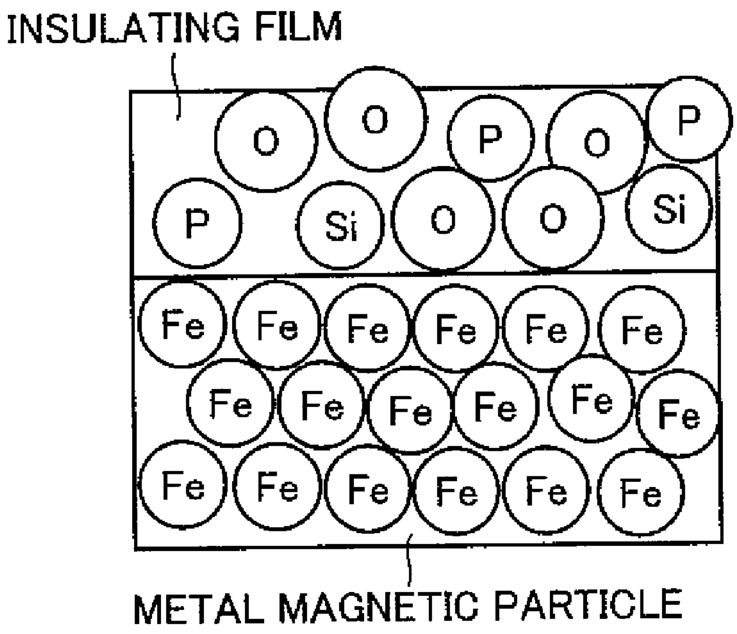
FIG. 5 is a schematic view when a heat treatment is performed on the soft magnetic material containing the insulating film made from silicon phosphate.
Figure 6:
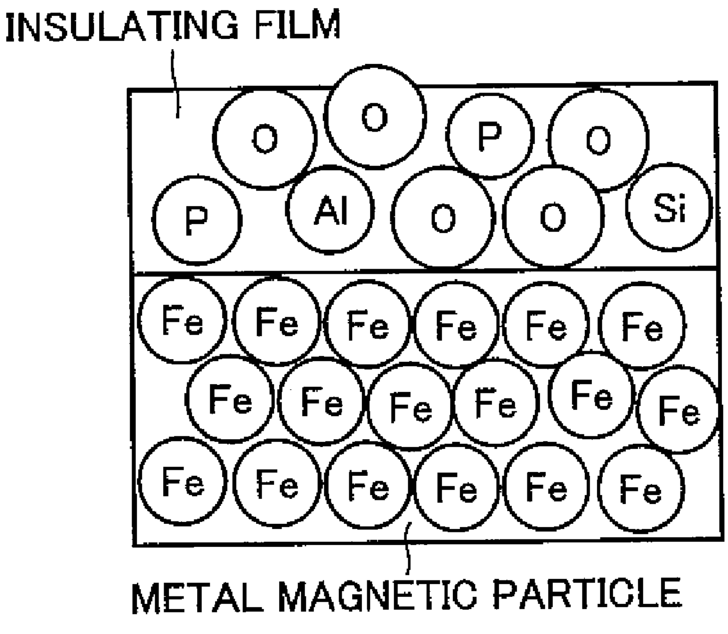
FIG. 6 is a schematic view when a heat treatment is performed on the soft magnetic material containing the insulating film in an embodiment of the present invention.

In the following, insulating film 20 in an embodiment of the present invention is described in detail referring to FIGS. 3 to 6, and Table 1. FIG. 3(A) is a schematic view before performing a heat treatment on the soft magnetic material containing the insulating film made from iron phosphate, and FIG. 3(B) is a schematic view after performing a heat treatment on the soft magnetic material containing the insulating film made from iron phosphate. FIG. 4A is a schematic view before performing a heat treatment on the soft magnetic material containing the insulating film made from aluminum phosphate, and FIG. 4B is a schematic view after performing a heat treatment on the soft magnetic material containing the insulating film made from aluminum phosphate. FIG. 5 is a schematic view when a heat treatment is performed on the soft magnetic material containing the insulating film made from silicon phosphate. FIG. 6 is a schematic view when a heat treatment is performed on the soft magnetic material containing the insulating film of the present invention. Further, Table 1 shows characteristics in the case of containing iron (Fe), aluminum (Al), silicon (Si), and aluminum and silicon (Al+Si) in the insulating film as cations.

and oxygen can be prevented from diffusing, and therefore, it becomes difficult for iron in the metal magnetic particle to move to the insulating film. That is, metallization of the insulating film can be prevented, and a decrease in the electric resistance can be suppressed. Further, when phosphate has a cation with high oxygen affinity, the heat resistance improves. Therefore, as shown in Table 1, it has an advantage that the heat resistance is high.

However, because aluminum has three bonds, the ratio of phosphorus and oxygen in the insulating film becomes small. Therefore, the insulating film made from aluminum phosphate is hard (flexibility is low), and therefore, there is a disadvantage that cracks are easily generated in the insulating film as shown in FIG. 4A.

Next, the insulating film made from silicon phosphate that is further another example of the conventional insulating films is described by referring to FIG. 5 and Table 1. As shown in FIG. 5, the insulating film made from silicon phosphate contains silicon, phosphorus, and oxygen. Because the number of bonds of silicon is four and this is the largest number, it can make a lot of bonds with phosphorus and oxygen in the insulating film. That is, much phosphorus and oxygen exist in the insulating film, and it becomes a soft (flexibility is high) insulating film. Therefore, as shown in Table 1, it has an advantage that the deformation-following property is good.

However, because silicon phosphate has lower oxygen affinity compared with aluminum as shown in Table 1, there is a disadvantage that it is a little low in the heat resistance. When it is a little low in the heat resistance, it is difficult to

TABLE 1

| | Film Heat Resistance | | Deformation-following Property | | | |
|---|---|---|---|---|---|---|
| Cation | Evaluation | Eddy Current Loss Increase Initial Temperature | Evaluation | Molded Body Eddy Current Loss (We 10/1k) | Oxygen Affinity Standard Production Heat | Number of Bonds |
| Fe | X | 400° C. | ◎ | 18 W/kg | −821 kJ/mol ($Fe_2O_3$) | 2 or 3 |
| Al | ◎ | 600° C. | ○ | 30 W/kg | −1677 kJ/mol ($Al_2O_3$) | 3 |
| Si | ○ | 550° C. | ◎ | 20 W/kg | −910 kJ/mol ($SiO_2$) | 4 |
| Al + Si | ◎ | 625° C. | ◎ | 22 W/kg | — | — |

First, the insulating film made from iron phosphate that is one example of the conventional insulating films is described by referring to FIGS. 3(A) and 3(B), and Table 1. As shown in FIG. 3(A), the insulating film before performing the heat treatment contains iron, phosphorus, and oxygen. As shown in FIG. 3(B), when the heat treatment is performed on the composite magnetic particle, the bond with oxygen is canceled because iron has low oxygen affinity as shown in Table 1. Then, phosphorus and oxygen in the insulating film move to the metal magnetic particle, and iron in the metal magnetic particle moves to the insulating film. That is, metallization of the insulating film proceeds, the electric resistance of the insulating film decreases, and there is a disadvantage that the eddy current loss becomes large.

Next, the insulating film made from aluminum phosphate that is another example of the conventional insulating films is described by referring to FIGS. 4A and 4B, and Table 1. As shown in FIG. 4A, the insulating film before performing the heat treatment contains aluminum, phosphorus, and oxygen. The number of bonds of aluminum is three (trivalent).

Then, as shown in FIG. 4B, because aluminum has high oxygen affinity even when the heat treatment is performed on the composite magnetic particle as shown in Table 1, the bonding with oxygen is maintained. Therefore, phosphorus perform the heat treatment at high temperature, and it is difficult to remove distortion and dislocation in the metal magnetic particle sufficiently. In the case that the distortion and dislocation cannot be removed, the hysteresis loss increases.

Next, insulating film 20 in an embodiment of the present invention containing aluminum, silicon, phosphorus, and oxygen is described by referring to FIG. 6 and Table 1. As shown in FIG. 6, insulating film 20 contains two types of cations of aluminum and silicon, phosphorus, and oxygen. As shown in Table 1, insulating film 20 is a complex phosphate having advantages and compensating the disadvantages of both aluminum and silicon as described above.

That is, because aluminum has high temperature stability (heat resistance) as shown in Table 1, it is difficult to be damaged even when the heat treatment is performed on the soft magnetic material at high temperature. Further, it plays a role of preventing decomposition of a layer formed on the contact surface of insulating film 20 contacting with metal magnetic particle 10. Therefore, the heat resistance of insulating film 20 can be improved by containing aluminum. Therefore, as shown in Table 1, the eddy current loss increase initial temperature of the molded body in which the soft magnetic material in the embodiment is pressure-molded can be made high.

Further, because the number of bonds of silicon is four, it becomes stable as a compound even in the case that the ratio of phosphorus in insulating film 20 is high. Therefore, the deformation-following property of insulating film 20 can be improved by containing silicon as shown in Table 1. Therefore, the strength can be improved, and at the same time, the eddy current loss of the molded body in which the soft magnetic material in the embodiment is pressure-molded can be lowered as shown in Table 1.

Further, because phosphorus and oxygen have high adhesiveness toward iron, the adhesiveness of metal magnetic particle 10 containing iron as the main component with insulating film 20 can be improved. Therefore, by containing phosphorus such as phosphate for example and oxygen in insulating film 20, it becomes difficult for insulating film 20 to be damaged during the pressure-molding, and an increase in the eddy current loss can be suppressed. Furthermore, by containing phosphate having phosphorus and oxygen in insulating film 20, the coating layer covering the surface of metal magnetic particle 10 can be made thinner. Therefore, the flux density of composite magnetic particle 30 can be made large, and the magnetic characteristics can be improved.

Therefore, in order to further improve the heat resistance imparting effect that trivalent aluminum has and the deformation-following property imparting effect that tetravalent silicon has, in the case that the molar amount of aluminum contained in insulating film 20 is represented by MAl, the sum of the molar amount of aluminum in insulating film 20 and the molar amount of silicon in insulating film 20 is represented by (MAl+MSi), and the molar amount of phosphorus in insulating film 20 is represented by MP, insulating film 20 in the embodiment satisfies the relationship of $0.4 \leqq MAl/(MAl+MSi) \leqq 0.9$ and the relationship of $0.25 \leqq (MAl+MSi)/MP \leqq 1.0$. Further, the relationship of $0.5 \leqq MAl/(MAl+MSi) \leqq 0.8$ and the relationship of $0.5 \leqq (MAl+MSi)/MP \leqq 0.75$ are preferably satisfied.

Insulating film 20 may be formed in one layer as shown in the drawing, or may be formed in multiple layers in which another insulating film is formed on a layer made of insulating film 20 of the present invention.

The average film thickness of insulating film 20 is preferably not less than 10 nm to not more than 1 μm. The average film thickness of insulating film 20 is more preferably not less than 20 nm to not more than 0.3 μm. By making the average film thickness of insulating film 20 10 nm or more, the energy loss due to the eddy current can be suppressed. By making the thickness 20 nm or more, the energy loss due to the eddy current can be effectively suppressed. On the other hand, by making the average film thickness of insulating film 20 1 μm or less, insulating film 20 can be prevented from being shear-fractured during the pressure-molding. Further, because the ratio of insulating film 20 occupying the soft magnetic material does not become too large, the flux density of the dust core obtained by pressure-molding the soft magnetic material can be prevented from remarkably decreasing. By making the average film thickness of insulating film 20 0.3 μm or less, a decrease in the flux density can be prevented further.

The average film thickness is determined by obtaining the equivalent thickness in consideration of a film composition obtained by a composition analysis (TEM-EDX: transmission electron microscope energy dispersive X-ray spectroscopy) and an element amount obtained by an inductively coupled plasma-mass spectrometry (ICP-MS), observing the film directly from a TEM image, and confirming that the order of the previously obtained equivalent thickness is an appropriate value.

The average particle size of composite magnetic particle 30 is preferably not less than 30 μm to not more than 500 μm. It is because it can be suppressed that the powder compressing property decreases and the flux density decreases by making the average particle size 30 μm or more. On the other hand, it is because the eddy current loss in the particle can be suppressed when the particle is used especially in the range of 1 kHz to 10 kHz by making the average particle size 500 μm or less.

Resin 40 is at least one type of resin selected from the group consisting of a silicone resin, an epoxy resin, a phenol resin, an amide resin, a polyimide resin, a polyethylene resin, and a nylon resin, and it is preferably attached to or coats the surface of insulating film 20. This resin 40 is added to increase the joining force between the composite magnetic particles adjacent to each other in the dust core.

Further, preferably, not less than 0.01% by mass to not more than 1.0% by mass of resin 40 to metal magnetic particle 10 is contained. It is because a decrease in transverse strength of the soft magnetic material and the dust core at high temperature can be prevented further by containing 0.01% by mass or more of resin 40. On the other hand, it is because the ratio of the non-magnetic layer occupying the soft magnetic material and the dust core is limited by containing 1.0% by mass or less of resin 40, and a decrease in the flux density can be prevented further.

Figure 7:
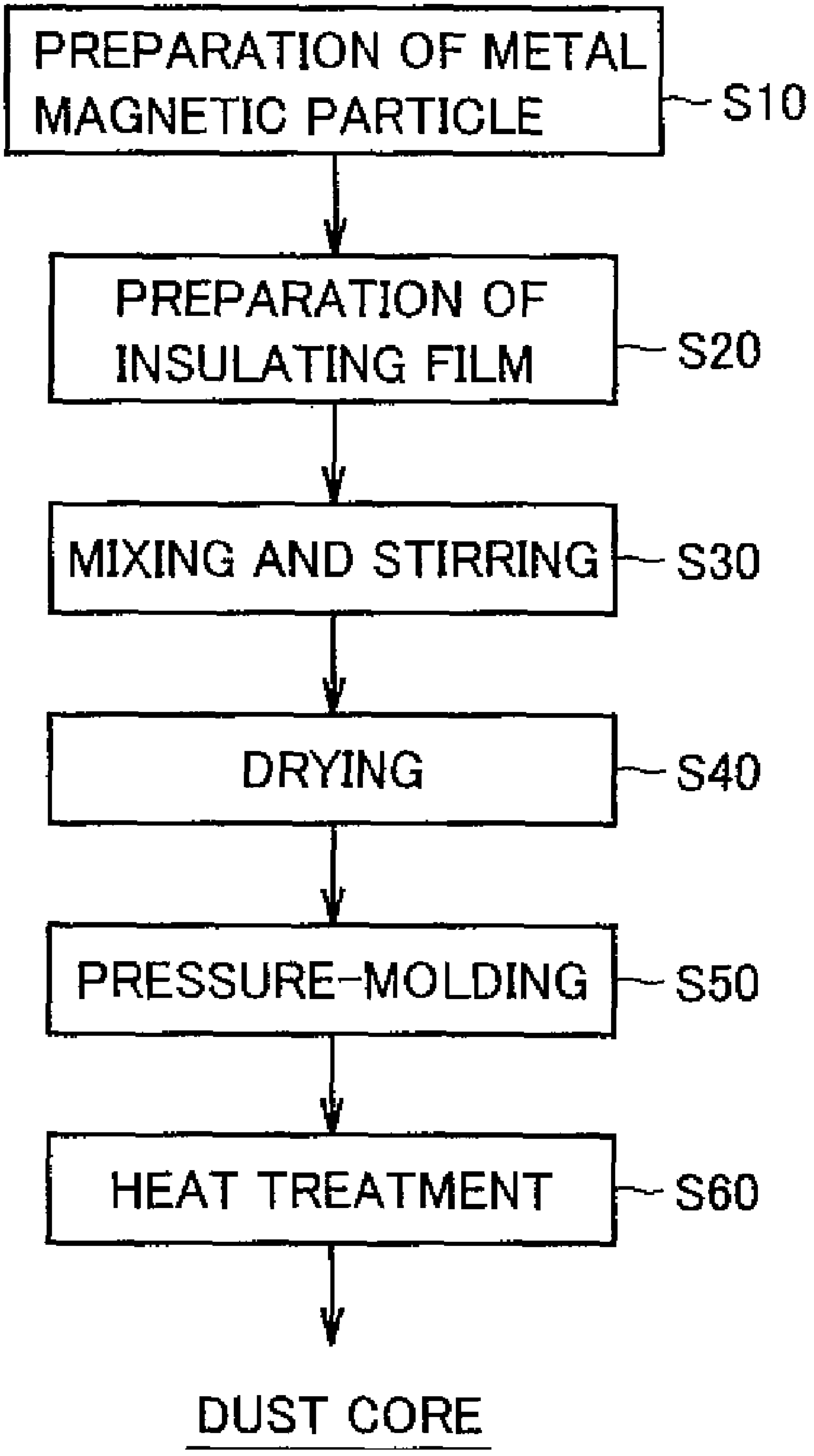
FIG. 7 is a flow chart showing the manufacturing method of the dust core in an embodiment of the present invention in the order of the steps.

Next, the method of manufacturing the soft magnetic material shown in FIG. 1 and the dust core shown in FIG. 2 is described by referring to FIGS. 1, 2, and 7. FIG. 7 is a flowchart showing the manufacturing method of the dust core in an embodiment of the present invention in the order of steps.

As shown in FIG. 7, first, a step (S10) of preparing metal magnetic particle 10 is carried out. Specifically, in this step (S10), metal magnetic particle 10 (metal magnetic particle powder that is the particle powder to be treated) containing iron as the main component is prepared.

Next, a step (S20) of preparing insulating film 20 is carried out. In this step (S20), a solution in which aluminum alkoxide is dispersed or dissolved into an organic solvent, silicon alkoxide, and a phosphoric acid solution are prepared to form insulating film 20 containing aluminum, silicon, phosphorus, and oxygen.

Types of alkoxide constituting aluminum alkoxide are not especially limited. However, methoxide, ethoxide, propoxide, isopropoxide, oxyisopropoxide, butoxide, and the like can be used, for example. Considering uniformity of the treatment and treatment effect, aluminumtriisopropoxide, aluminumtributoxide, and the like are preferably used as aluminum alkoxide.

The organic solvent is not especially limited as long as it is an organic solvent that is generally used. However, it is preferably a water-soluble organic solvent. Specific examples that can preferably be used include alcohol solvents such as ethyl alcohol, propyl alcohol, and butyl alcohol, ketone solvents such as acetone and methylethylketone, glycol ether solvents such as methyl cellosolve, ethyl cellosolve, propyl cellosolve, and butyl cellosolve, oxyethylenes such as diethylene glycol, triethylene glycol, polyethylene glycol, dipropylene glycol, tripropylene glycol, and polypropylene glycol, an oxypropylene addition polymer, alkylene glycols such as ethylene glycol, propylene glycol, and 1,2,6-hexanetriol, glycerin, and 2-pyrrolidone. It is more preferably alcohol solvents such as ethyl alcohol, propyl alcohol, and butyl alcohol, and ketone solvents such as acetone and methylethylketone.

Examples of the types of alkoxide constituting silicon alkoxide that can be used include methoxide, ethoxide, propoxide, isopropoxide, oxyisopropoxide, and butoxide. Further, ethylsilicate and methylsilicate obtained by partially hydrolyzing and condensing tetraethoxysilane or tetramethoxysilane can be used. Considering uniformity of the treatment and treatment effect, tetraethoxysilane, tetramethoxysilane, methylsilicate, and the like are preferably used as silicon alkoxide.

Further, silicon alkoxide and aluminum alkoxide are preferably used by dispersing or dissolving into the above-described organic solvent in advance to perform a more uniform treatment in the case that they are solid.

Further, it is not especially necessary to add water in the hydrolysis of silicon alkoxide and aluminum alkoxide in order to make a finer inorganic compound attach or coat the surface of the metal magnetic particle. The hydrolysis is preferably performed with moisture in the organic solvent and moisture in the soft magnetic particle.

The added amount of aluminum alkoxide differs depending on the specific surface area of the metal magnetic particle powder. It is 8.8×10-6 parts by weight to 0.38 parts by weight in an Al conversion per 100 parts by weight of the metal magnetic particle powder, and preferably 1.8×10-5 parts by weight to 0.11 parts by weight. By making the added amount in this range, an insulating film having the objective composition of the present invention can be formed.

The added amount of silicon alkoxide differs depending on the specific surface area of the metal magnetic particle powder. It is 2.4×10-6 parts by weight to 0.26 parts by weight in an Si conversion per 100 parts by weight of the metal magnetic particle powder, and preferably 4.8×10-6 parts by weight to 0.078 parts by weight. By making the added amount in this range, an insulating film having the objective composition of the present invention can be formed.

Phosphoric acid is an acid made by hydrating phosphorus pentoxide, and methaphosphoric acid, pyrophosphoric acid, orthophosphoric acid, triphosphoric acid, and tetraphosphoric acid can be used for example.

The added amount of phosphoric acid differs depending on the specific surface area of the metal magnetic particle powder. It is normally 6.5×10-5 parts by weight to 0.87 parts by weight in a P conversion per 100 parts by weight of the metal magnetic particle powder, and preferably 1.3×10-4 parts by weight to 0.26 parts by weight. By making the added amount in this range, an insulating film having the objective composition of the present invention can be formed.

Next, a step (S30) of mixing and stirring metal magnetic particle 10, aluminum alkoxide, silicon alkoxide, and phosphoric acid is carried out. In this step (S30), a high speed agitating mixer can be used as a machine for mixing. Specifically, a Henschel mixer, a speed mixer, a ball cutter, a power mixer, a hybrid mixer, a cone blender, or the like can be used.

In the mixing and stirring step (S30), in the case of adding phosphoric acid as a solution, a very small amount is preferably added in portions in order to prevent the hydrolysis from proceeding rapidly.

The mixing and stirring step (S30) is preferably performed at not lower than room temperature to not higher than the boiling point of the organic solvent that is used from the viewpoint of good mixing. Further, the reaction is preferably performed in an inert gas atmosphere such as N2 gas from the viewpoint of oxidation prevention of metal magnetic particle 10.

In the mixing and stirring step (S30), aluminum alkoxide, silicon alkoxide, and phosphoric acid may be added at the same time, or may be added separately.

Next, a step (S40) of drying the obtained composite magnetic particle 30 is carried out. In this step (S40), composite magnetic particle 30 is dried at room temperature in a draft for 3 hours to 24 hours. After that, by drying further in the temperature range of 60° C. to 120° C. or by drying at a reduced pressure in the temperature range of 30° C. to 80° C., composite magnetic particle 30 can be obtained. The step (S40) of drying can be performed either in air or in an inert gas atmosphere such as N2 (nitrogen) gas. The step is preferably performed in an inert gas atmosphere such as N2 gas from the viewpoint of oxidation prevention of metal magnetic particle 10.

By carrying out steps (S20 and S30), insulating film 20 surrounding the surface of metal magnetic particle 10 is formed. By the above steps (S10 to S30), a plurality of composite magnetic particles 30 having insulating film 20 surrounding the surface of metal magnetic particle 10 containing iron as the main component can be produced.

Next, a step of mixing resin 40 into a plurality of composite magnetic particles 30 is preferably carried out. In this step, resin 40 that is at least one type of resin selected from the group consisting of a silicone resin, an epoxy resin, a phenol resin, an amide resin, a polyimide resin, a polyethylene resin, and a nylon resin is prepared. Further, in this step, the mixing method is not especially limited, and any of a mechanical alloying method, a vibration ball mill, a planetary ball mill, mechanofusion, a coprecipitation method, a chemical vapor deposition method (CVD method), a physical vapor deposition method (PVD method), a plating method, a sputtering method, a vapor deposition method, a sol-gel method, and the like can be used.

By the above steps (S10 to S40), the soft magnetic material in the present embodiment including insulating film 20 satisfying the relationship of $0.4 \leqq MAl/(MAl+MSi) \leqq 0.9$ and the relationship of $0.25 \leqq (MAl+MSi)/MP \leqq 1.0$ shown in FIG. 1 can be obtained. In the case of manufacturing the dust core shown in FIG. 2, the following steps are performed further.

A step (S50) of pressure-molding the obtained soft magnetic material is carried out. In this step (S50), the obtained soft magnetic material is placed in a mold, and pressure-molded at a pressure of 700 MPa to 1500 MPa, for example. With this operation, the soft magnetic material is compressed and a molded body can be obtained. The atmosphere for performing the pressure-molding is preferably an inert gas atmosphere or a reduced pressure atmosphere. In this case, composite magnetic particle 30 can be prevented from being oxidized by oxygen in the atmosphere.

Next, a step (S60) of performing the heat treatment is carried out. In this step (S60), the heat treatment is performed on the molded body obtained by the pressure-molding at a temperature of 400° C. or more to less than the thermal decomposition temperature of insulating film 20. With this operation, distortion and dislocation existing inside the molded body are removed. At this time, because the heat treatment is carried out at a temperature less than the thermal decomposition temperature of insulating film 20, insulating film 20 does not deteriorate due to this heat treatment. Further, resin 40 becomes organic substance 50 by the heat treatment.

After the heat treatment, by carrying out an appropriate process such as an extruding process or a shaving process on the molded body, the dust core shown in FIG. 2 is completed. The dust core shown in FIG. 2 is produced by the above steps (S10 to S60).

As described above, the soft magnetic material in the embodiment of the present invention is a soft magnetic material including a plurality of composite magnetic particles having metal magnetic particle 10 containing iron as the main component and insulating film 20 surrounding the surface of metal magnetic particle 10, in which insulating film 20 contains aluminum, silicon, phosphorus, and oxygen, and satisfies the relationship of $0.4 \leqq MAl/(MAl+MSi) \leqq 0.9$ and the relationship of $0.25 \leqq (MAl+MSi)/MP \leqq 1.0$ in the case that the molar amount of aluminum contained in insulating film 20 is represented by MAl, the sum of the molar amount of aluminum contained in insulating film 20 and the molar amount of silicon contained in insulating film 20 is represented by (MAl+MSi), and the molar amount of phosphorus contained in insulating film 20 is represented by MP. By containing aluminum in the above-described range in insulating film 20, the heat resistance of the insulating film can be improved, and the hysteresis loss of the dust core made by pressure-molding this soft magnetic material can be lowered. Further, by containing silicon in the above-described range in insulating film 20, the deformation-following property of insulating film 20 can be improved, and the eddy current loss can be lowered. Therefore, an excellent soft magnetic material can be made that is capable of lowering the iron loss.

Further, the manufacturing method of the soft magnetic material in the embodiment of the present invention includes step (S10) of preparing metal magnetic particle 10 containing iron as the main component and steps (S20 and S30) of forming insulating film 20 surrounding the surface of metal magnetic particle 10, and steps (S20 and S30) of forming the insulating film includes step (S30) of mixing and stirring metal magnetic particle 10, aluminum alkoxide, silicon alkoxide, and phosphoric acid. With this configuration, insulating film 20 containing aluminum having high heat resistance, silicon having high deformation-following property, phosphorus, and oxygen can be formed. Therefore, an excellent soft magnetic material can be manufactured that is capable of lowering the iron loss. In the embodiment, the soft magnetic material is manufactured so that the relationship of $0.4 \leqq MAl/(MAl+MSi) \leqq 0.9$ and the relationship of $0.25 \leqq (MAl+MSi)/MP \leqq 1.0$ are satisfied in the case that the molar amount of aluminum contained in insulating film 20 is represented by MAl, the sum of the molar amount of aluminum contained in insulating film 20 and the molar amount of silicon contained in insulating film 20 is represented by (MAl+MSi), and the molar amount of phosphorus contained in insulating film 20 is represented by MP.

In the present example, the effects of the soft magnetic material and the dust core of the present invention were investigated. First, each dust core of the example of the present invention and comparative examples was manufactured by the following method so as to have a composition in Table 2 described below.

Example 1

In the present example, the effects of the soft magnetic material and the dust core of the present invention were investigated. First, each dust magnetic dust core of the example of the present invention and comparative examples was manufactured by the following method so as to have a composition in Table 2 described below.

(Production of Dust Core in Example of the Present Invention)

The dust core was produced according to the manufacturing method in the embodiment. Specifically, ABC 100.30 manufactured by Höganäs AB having an iron purity of 99.8% or more and an average particle size of 80 μm was prepared as metal magnetic particle 10. Then, an acetone solution of aluminum alkoxide, a solution of silicon alkoxide, and a phosphoric acid solution was prepared so that the ratio shown in Table 2 can be achieved and that the relationship of $0.4 \leqq M_{Al}/(M_{Al}+M_{Si}) \leqq 0.9$ and the relationship of $0.25 \leqq (M_{Al}+M_{Si})/M_P \leqq 1.0$ are satisfied in the case that the molar amount of aluminum contained in the insulating film is represented by $M_{Al}$, the sum of the molar amount of aluminum contained in the insulating film and the molar amount of silicon contained in the insulating film is represented by $(M_{Al}+M_{Si})$, and the molar amount of phosphorus contained in the insulating film is represented by $M_P$, insulating film 20 containing aluminum, silicon, phosphorus, and oxygen was formed on the surface of metal magnetic particle 10 with an average thickness of 150 nm by soaking the particle in these solutions and then drying at reduced pressure at 45° C. With this operation, composite magnetic particle 30 was obtained.

In Table 2, the molar amount of aluminum ($M_{Al}$) is described as Al, the sum of the molar amount of aluminum and the molar amount of silicon (MAl+MSi) is described as Me, and the molar amount of phosphorus (MP) is described as P.

Then, 0.2 wt % of TSR116 (manufactured by GE Toshiba Silicone Inc.) and 0.1 wt % of XC96-B0446 (manufactured by GE Toshiba Silicone Inc.) as the silicone resin were dissolved and dispersed in a xylene solvent, and the above-described composite magnetic particle 30 was thrown into this solution. After that, a stirring treatment and a vaporizing and drying treatment were performed in the room temperature. Then, by performing a heat curing treatment at 180° C. for 1 hour, the soft magnetic material in which resin 40 is formed was obtained.

Next, the soft magnetic material was pressure-molded at a surface pressure of 1280 MPa, and a ring-shaped (outer diameter 34 mm, inner diameter 20 mm, thickness 5 mm) molded body was produced. After that, the heat treatment was performed on the molded body at 550° C. for 1 hour in a nitrogen atmosphere. With this operation, the dust core of the example of the present invention was produced.

(Production of Dust Core in Comparative Example 1)

Basically, it is same as the example of the present invention. However, Comparative Example 1 differs only in a point of forming an insulating film that does not contain aluminum and silicon in the step of forming the insulating film. Comparative Example 1 corresponds to Me/P=0 in Table 2.

(Production of Dust Core in Comparative Example 2)

Basically, it is same as the example of the present invention. However, Comparative Example 2 differs only in a point of forming an insulating film that does not contain aluminum in the step of forming the insulating film. Comparative Example 2 corresponds to Al/Me=0 in Table 2.

(Production of Dust Core in Comparative Example 3)

Basically, it is same as the example of the present invention. However, Comparative Example 3 differs only in a point of forming an insulating film that does not contain silicon in the step of forming the insulating film. Comparative Example 3 corresponds to Al/Me=1.0 in Table 2.

(Production of Dust Core in Comparative Example 4)

Basically, it is same as the example of the present invention. However, Comparative Example 4 differs only in a point of forming an insulating film in which aluminum and silicon are outside of the range of $0.4 \leqq M_{Al}/(M_{Al}+M_{Si}) \leqq 0.9$ and outside of the range of $0.25 \leqq (M_{Al}+M_{Si})/M_P \leqq 1.0$ and an insulation film outside of the range of Comparative Examples 1 to 3 was formed in the step of forming the insulating film. Comparative Example 4 corresponds to those outside of the range of $0.4 \leqq Al/Me \leqq 0.9$ and $0.25 \leqq Me/P \leqq 1.0$ in Table 2, and other than Comparative Examples 1 to 3.

(Measurement of the Eddy Current Loss)

Next, the evaluation of the iron loss characteristic of the dust core was performed by winding uniformly a coil (primary winding number is 300 times and secondary winding number is 20 times) on the circumference of the produced dust core. A BH Tracer (ACBH-100K type) manufactured by Riken Denshi Co., Ltd. was used in the evaluation, and it was measured at an excitation flux density of 1 (T: tesla) and a measurement frequency of 50 Hz to 1000 Hz. A hysteresis loss coefficient Kh and an eddy current loss Ke were calculated by performing fitting by a method of least squares to a relation formula of W10/f=Kh×f+Ke×f2 from a frequency characteristic of the iron loss value W10/f (W/kg) per 1 kg of each dust core obtained by the measurement. The eddy current loss We10/1K (W/kg)=Ke×10002 is shown in Table 2 in the case of the excitation flux Bm=1.0 T and the frequency f=1 kHz.

TABLE 2

| | Me/P = 0 | Me/P = 0.1 | Me/P = 0.25 | Me/P = 0.5 | Me/P = 0.75 | Me/P = 1.0 | Me/P = 1.5 | Me/P = 2.0 | Me/P = 3 |
|---|---|---|---|---|---|---|---|---|---|
| Al/Me = 0 | 116 | 86 | 68 | 57 | 68 | 90 | 138 | 152 | 171 |
| Al/Me = 0.1 | 116 | 81 | 80 | 48 | 55 | 86 | 128 | 168 | 150 |
| Al/Me = 0.2 | 116 | 88 | 70 | 45 | 48 | 89 | 110 | 133 | 150 |
| Al/Me = 0.3 | 116 | 75 | 56 | 36 | 47 | 77 | 119 | 98 | 146 |
| Al/Me = 0.4 | 116 | 59 | 33 | 26 | 31 | 35 | 112 | 85 | 138 |
| Al/Me = 0.5 | 116 | 70 | 26 | 21 | 24 | 32 | 59 | 80 | 71 |
| Al/Me = 0.6 | 116 | 72 | 25 | 20 | 24 | 33 | 39 | 66 | 57 |
| Al/Me = 0.7 | 116 | 66 | 28 | 19 | 23 | 29 | 46 | 76 | 62 |
| Al/Me = 0.8 | 116 | 52 | 33 | 22 | 23 | 28 | 43 | 80 | 69 |
| Al/Me = 0.9 | 116 | 55 | 34 | 33 | 29 | 33 | 55 | 80 | 68 |
| Al/Me = 1.0 | 116 | 50 | 42 | 36 | 36 | 38 | 63 | 79 | 76 |

As shown in Table 2, in the dust core in the example of the present invention in the ranges of $0.4 \leqq M_{Al}/(M_{Al}+M_{Si}) \leqq 0.9$ and $0.25 \leqq (M_{Al}+M_{Si})/M_P \leqq 1.0$, the eddy current loss became 35 W/kg or less, and the eddy current loss in the high temperature heat treatment was lowered.

Further, in the dust core in the example of the present invention in the ranges of $0.5 \leqq M_{Al}/(M_{Al}+M_{Si}) \leqq 0.8$ and $0.5 \leqq (MAl+MSi)/MP \leqq 0.75$, the eddy current loss became 24 W/kg or less, and the eddy current loss in the high temperature heat treatment was lowered very much.

On the other hand, the eddy current loss in Comparative Example 1 having an insulating film that does not contain aluminum and silicon was high, being 116 W/kg. Further, the eddy current loss in Comparative Example 2 having an insulating film that does not contain aluminum was high, being 57 W/kg to 171 W/kg. Further, the eddy current loss in Comparative Example 3 having an insulating film that does not contain silicon was a little higher, being 36 W/kg to 79 W/kg compared with the example of the present invention. Further, the eddy current loss in Comparative Example 4 in which the molar amounts of aluminum, silicon, and phosphorus are outside of the ranges of $0.5 \leqq MAl/(MAl+MSi) \leqq 0.8$ and $0.5 \leqq (MAl+MSi)/MP \leqq 0.75$ was a little higher, being 36 W/kg to 168 W/kg compared with the example of the present invention.

As described above, according to Example 1, it was found that the iron loss decreases through a decrease in the eddy current loss by satisfying the relationship of $0.4 \leqq MAl/(MAl+MSi) \leqq 0.9$ and the relationship of $0.25 \leqq (MAl+MSi)/MP \leqq 1.0$ in the case that the molar amount of aluminum contained in the insulating film is represented by MAl, the sum of the molar amount of aluminum contained in the insulating film and the molar amount of silicon contained in the insulating film is represented by (MAl+MSi), and the molar amount of phosphorus contained in the insulating film is represented by MP.

The embodiment and examples disclosed herein are illustrative in all aspects, and it must be considered that they are not limited. The scope of the present invention is shown by the scope of the claims not the above-described embodiment, and meanings equivalent to the scope of the claims and all changes within the range are intended to be included.

The invention claimed is:

1. A soft magnetic material comprising:

a plurality of composite magnetic particles having a metal magnetic particle containing iron as the main component; and an insulating film surrounding the surface of said metal magnetic particle, wherein said insulating film contains aluminum, silicon, phosphorus, and oxygen, said insulating film satisfies the relationship of $0.4 \leqq M_{Al}/(M_{Al}+M_{Si}) \leqq 0.9$ and the relationship of $0.25 \leqq (M_{Al}+M_{Si})/M_P \leqq 1.0$ in the case that the molar amount of aluminum contained in said insulating film is represented by $M_{Al}$, the sum of the molar amount of aluminum contained in said insulating film and the molar amount of silicon contained in said insulating film is represented by $(M_{Al}+M_{Si})$, and the molar amount of phosphorus contained in said insulating film is represented by $M_P$, and the insulating film comprises a phosphate non-crystalline structure wherein the aluminum and silicon are cations of the phosphate.

2. The soft magnetic material according to claim 1, further satisfying the relationship of $0.5 \leqq M_{Al}/(M_{Al}+M_{Si}) \leqq 0.8$ and the relationship of $0.5 \leqq (M_{Al}+M_{Si})/M_P \leqq 0.75$.

3. The soft magnetic material according to claim 1, wherein the average film thickness of said insulating film is not less than 10 nm to not more than 1 μm.

4. The soft magnetic material according to claim 1, wherein at least one type of resin selected from the group consisting of a silicone resin, an epoxy resin, a phenol resin, an amide resin, a polyimide resin, a polyethylene resin, and a nylon resin, is attached to or coat the surface of said insulating film.

5. The soft magnetic material according to claim 4, wherein not less than 0.01% by mass to not more than 1.0% by mass of said resin to said metal magnetic particle is contained.

6. A dust core produced using the soft magnetic material according to claim 1.

7. The dust core according to claim 6, wherein the eddy current loss is 35 W/kg or less at a maximum excitation flux density of 1 T and a frequency of 1000 Hz.

* * * * *